Patented Feb. 14, 1950

2,497,100

UNITED STATES PATENT OFFICE 2,497,100

MERCAPTO-ALKOXY THIO-ETHERS

Harold R. Snyder, Urbana, Ill., and John M. Stewart, Berkeley, Calif., assignors to Phillips Petroleum Company, a corporation of Delaware No Drawing. Application May 9, 1947, Serial No. 747,121

16 Claims. (Cl. 260—609)

This invention relates to a method for the production of mercapto alkoxy thio-ethers and to the products formed thereby. More specifically, the present invention relates to a method for the production of mercapto alkoxy thio-ethers by the reaction of an alkoxy thiol with an olefin sulfide and to the products produced thereby.

In accordance with this invention it has been found that when an olefin sulfide is reacted with an alkoxy thiol the reaction product is a mercapto alkoxy thio-ether. The reaction products have important uses in the field of manufacture of synthetic rubber. In addition, they are useful as intermediates for the preparation of other chemical products.

The mercapto alkoxy thio-ether products formed by the process of this invention contain primary or secondary mercaptan groups. Mixtures of isomeric compounds containing primary and tertiary mercaptan groups may also be obtained. The particular configuration of the product is dependent upon the olefin sulfide employed. For example, ethylene sulfide provides primary mercapto alkoxy thio-ethers, cyclohexene sulfide provides secondary mercapto alkoxy thio-ethers, and isobutylene sulfide reacts to form a mixture of the isomeric primary and tertiary mercapto alkoxy thio-ethers.

An object of the present invention is to provide a process for the production of mercapto alkoxy thio-ethers.

Another object of this invention is to provide such a process wherein the mercapto alkoxy thio-ethers are prepared by the reaction of alkoxy thiols with olefin sulfide.

Still another object of this invention is to provide mercapto alkoxy thio-ethers as new chemical compounds.

As stated hereinabove, various alkoxy thiols may be employed to produce new chemical compounds by reaction with an olefin sulfide in accordance with the present invention. The olefin sulfides, of which ethylene sulfide is the simplest member, contain a sulfur atom attached to two directly-connected carbon atoms, which may be represented structurally as follows:

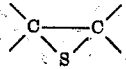

wherein the carbon atoms may be a part of a ring or of an open chain of greater length. As examples of olefin sulfides suitable for use in the process of the present invention, in addition to ethylene sulfide, the following may be mentioned: propylene sulfide, isobutylene sulfide, 1,2-butylene sulfide, higher alkene sulfides; cyclic olefin sulfides, e. g., cyclopentene sulfide, cyclohexene sulfide, and the like; and substituted olefin sulfides, e. g., 3-phenylpropylene sulfide.

The alkoxy thiols used in carrying out the method of the present invention may be primary, secondary, or tertiary and comprise those prepared from the interaction of an olefin sulfide with an alcohol. Applicants' copending application Serial No. 747,120, filed May 9, 1947, discloses the production of alkoxy thiols by the interaction of olefin sulfides with alcohols. As disclosed therein, the alcohols may be primary, secondary or tertiary, the primary aliphatic alcohols being most reactive. Other alcohols which may be employed in preparing the alkoxy thiol by reaction with an olefin sulfide include unsaturated alcohols, polyhydric alcohols, aromatic alcohols, and substituted alcohols. Examples of alcohols which may be used to prepare alkoxy thiols for use as starting material for the present invention are aliphatic alcohols, e. g., ethanol, propanol, butanol, isobutanol and the like; aromatic alcohols, e. g., 2-phenylethanol, 3-phenylpropanol, and the like; glycol-monoethers, e. g., ethylene glycol monoethyl ether, etc. As disclosed in our application Serial No. 747,120, the alkoxy thiols so produced contain the structure

when R is the radical attached to the OH group of the alcohols.

In carrying out the reaction a mixture of the olefin sulfide and the alkoxy thiol is made up, suitably, but not necessarily, in substantially equimolecular proportions. Desirably, but not necessarily, the reaction mixture is agitated during at least a part of the reaction period. When a polymerizable olefin sulfide, such as ethylene sulfide, is employed a suitable inhibiting agent, such as a mercaptan, should be incorporated in the reaction mixture. The reaction may be carried out at various temperatures and over widely different periods of time. While a temperature within the range from about 0° C. to about 250° C. may be employed, preferably the reaction temperature is within the range of from about 20° C. to about 160° C. It will be obvious to one skilled in the art, that a temperature above decomposition temperature of a reactant should not be employed. To increase the rate of reaction, it is often desirable to heat the mixture of reactants to a temperature somewhat above normal room temperature (20° C.), but generally not above the boiling point of the mixture. The reaction may generally be carried out satisfactorily under what is known as reflux conditions, i. e. heating the reaction mixture while condensing and returning evolved vapors to the reaction mixture. A number of the mercapto alkoxy thio-ethers of this invention have been prepared in this manner using steam at 100° C. as the heating medium. While the reaction is preferably carried out in liquid phase, it may in some instances be carried out in vapor phase, if desired, the choice being dependent upon the reaction, the catalyst employed, and the like, as will be evident to one skilled in the art. A period of from about one hour to about 100 hours is suitable for the reaction, but a reaction time of from about 6 to about 24 hours is generally sufficient and preferably employed. While the pressure may be varied, ordinary atmospheric pressure is conveniently used in carrying out the reaction. In carrying out the reaction a mixture of alkoxy thiol and olefin sulfide may or may not be diluted with diluent, such as ethyl alcohol, diethyl ether, and similar solvents.

A catalyst is preferably employed to promote the reaction between the alkoxy thiol and the olefin sulfide. Suitable catalysts comprise acids, e. g., sulfuric acid, phosphoric acid, etc.; boron halides, e. g., boron fluoride; boron fluoride complex catalysts, e. g., the addition products of boron fluoride with diethyl ether and with acetic acid; and sodium. Sodium is a preferred catalyst, particularly with ethyl alcohol, as sodium alcoholate. The boron fluoride complex catalysts are also preferred catalysts for the present process, particularly the addition product of boron fluoride with acetic acid. Other carboxylic acids may be used for the preparation of a boron fluoride addition product suitable as catalyst for my process. The complex catalyst is prepared by the addition of boron fluoride to the acid. The reaction between the acid and the boron fluoride is exothermic and should be carried out under conditions such that the temperature does not rise above about 100° C. The boron fluoride-acetic acid addition compound which contains two mols of acetic acid per mol of boron fluoride, is conveniently prepared by bubbling the boron fluoride through the acid. Other boron halides, particularly boron chloride and boron bromide, may be used alone or in conjunction with other compounds as catalysts. The addition compound formed by equimolecular amounts of boron fluoride and diethyl ether is also one of the preferred catalysts for the process.

In a specific embodiment of the present invention an alkoxy thiol, such as ethoxyethyl thiol is reacted with an olefin sulfide such as isobutylene sulfide. Equal molecular amounts of the reactants are dissolved in ethanol in which one mol per cent of sodium is added as catalyst. The mixture is heated at the reflux temperature for from about 10 to about 20 hours after which the crude product is fractionally distilled under reduced pressure. The reaction proceeds according to the following equations to provide a mixture of isomeric primary and tertiary mercapto alkoxy thio-ethers:

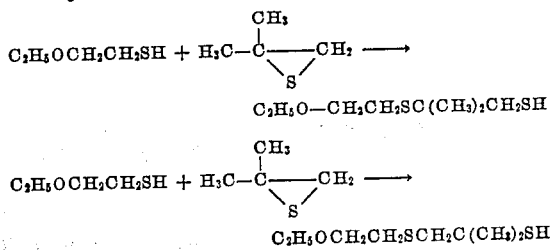

EXAMPLE I

*Addition product of 2-ethoxyethylthiol with isobutylene sulfide*

To a solution of 0.02 gram of sodium in 25 ml. of absolute ethyl alcohol were added 10.6 grams of 2-ethoxyethylthiol and 8.8 grams of isobutylene sulfide. The mixture was heated at the reflux temperature for 15 hours after which the crude product was fractionally distilled under a pressure of 2.5 mm. A yield of 12.4 grams (64 per cent of theory) of product boiling at 84–85° C. (2.5 mm.) and with an index of refraction of 1.4948 (20° C.) was obtained. Amperometric analysis showed this material to contain 98.2% total mercaptan as a mixture of 56.4 per cent primary and 43.6 per cent tertiary mercapto alkoxy thio-ethers.

EXAMPLE II

*Addition product of 2-(2'-ethoxyethoxy) ethylthiol and isobutylene sulfide*

The procedure of Example I was repeated employing 7.5 grams of 2-(2'-ethoxyethoxy) ethylthiol and 4.4 grams of isobutylene sulfide. A yield of 7.7 grams (64.7 per cent of theory) of product boiling at 140° C. (3 mm.) and with an index of refraction of 1.4900 (20° C.) was obtained.

EXAMPLE III

*Addition product of 2-ethoxyethylthiol with cyclohexene sulfide*

The procedure of Example I was repeated employing 5.3 grams of 2-ethoxyethylthiol and 5.7 grams of cyclohexene sulfide. A yield of 5.9 grams (54.5 per cent of theory) of product boiling at 112–114° C. (2.5 mm.) and with a refractive index of 1.5195 was obtained.

EXAMPLE IV

The mercapto alkoxy thio-ether addition product comprising two mols of isobutylene sulfide per mol of ethylene glycol monoethyl ether was prepared as follows. A mixture of 18 grams of ethylene glycol monoethyl ether and 4.4 grams of isobutylene sulfide was reacted in the presence of 0.18 gram of boron fluoride etherate (the addition product of boron fluoride and diethyl ether) as catalyst. The product obtained had a boiling range of 110 to 125° C. at 3 mm. and an index of refraction of 1.5006 at 20° C. Amperometric analysis showed the fraction contained 95.5% total mercaptan made up of 39.9% primary and 60.1% tertiary mercapto alkoxy thio-ether.

The mercapto alkoxy thio-ethers produced in accordance with the present invention are the addition products of an olefin sulfide and an alkoxy thiol. The product may be prepared by the stepwise addition of two mols of an olefin sulfide to an alcohol. It will be evident that this latter procedure is the equivalent of the former since an alkoxy thiol is first formed which then reacts with an additional mol of the olefin sulfide. It is believed that the reaction and the products formed are accurately represented herein. However, it is not intended to limit the present invention in any respect by the theory contained herein.

We claim:

1. The method of producing a mercapto alkoxy thio-ether which comprises reacting one molecular equivalent of an alkoxy thiol containing from 4 to 18 carbon atoms per molecule, with a molecular equivalent of an olefin sulfide containing from 2 to 9 carbon atoms per molecule, and recovering as a product of the process, from the reaction mixture, a resulting mercapto alkoxy thio-ether.

2. The method of producing a mercapto alkoxy thio-ether which comprises reacting one molecular equivalent of an alkoxy thiol containing from 4 to 18 carbon atoms per molecule with a molecular equivalent of an olefin sulfide containing from 2 to 9 carbon atoms per molecule, in the presence of sodium as a catalyst, and recovering as a product of the process, from the reaction mixture, a resulting mercapto alkoxy thio-ether.

3. The method of producing a mercapto alkoxy thio-ether which comprises reacting one molecular equivalent of an alkoxy-thiol containing from 4 to 18 carbon atoms per molecule, with a molecular equivalent of an olefin sulfide containing from 2 to 9 carbon atoms per molecule in the presence of a solution of sodium in ethyl alcohol as a catalyst, and recovering from the reaction mixture a resulting mercapto alkoxy thio-ether as a product of the process.

4. The method of producing a mercapto alkoxy thio-ether which comprises the reaction of one molecular equivalent of 2-ethoxyethylthiol with one molecular equivalent of isobutylene sulfide in the presence of sodium as a catalyst, and recovering from the reaction mixture a resulting mercapto alkoxy thio-ether as a product of the process.

5. The method of producing a mercapto alkoxy thio-ether which comprises the reaction of one molecular equivalent of 2-(2'-ethoxyethoxy) ethylthiol with one molecular equivalent of isobutylene sulfide in the presence of sodium as a catalyst, and recovering from the reaction mixture a resulting mercapto alkoxy thio-ether as a product of the process.

6. The method of producing a mercapto alkoxy thio-ether which comprises reacting a molecular equivalent of 2-ethoxyethylthiol with one molecular equivalent of cyclohexene sulfide in the presence of sodium as a catalyst.

7. A 2-mercapto-2'-alkoxy thio-ether containing from 6 to 27 carbon atoms per molecule.

8. A butyl mercapto 2-(ethoxy) ethyl thio-ether.

9. Cyclohexane mercapto 2-(ethoxy) ethyl thio-ether.

10. A butyl mercapto 2-(2' ethoxyethoxy ethyl thio ether.

11. The method of producing a butyl mercapto ethoxy ethyl thio-ether which comprises reacting one molecular equivalent of 2-ethoxy ethyl thiol with a molecular equivalent of isobutylene sulfide in the presence of sodium dissolved in ethyl alcohol as a catalyst, at a temperature within the limits of 20 to 160° C., a pressure of at least one atmosphere, and for a duration of at least one hour; and recovering a butyl mercaptoethoxy ethyl thio-ether from the reaction mixture as a product of the process.

12. A process for producing a mercaptoalkoxy thio-ether from an alkoxy thiol containing from 4 to 18 carbon atoms per molecule and an olefin sulfide containing from 2 to 9 carbon atoms per molecule, which comprises reacting one molecular equivalent of said alkoxy thiol with at least one molecular equivalent of said olefin sulfide in the presence of sodium as a catalyst, maintaining the reaction in ethyl alcohol solution at a temperature within the limits of 20 to 160° C, at a pressure of at least one atmosphere, for a duration of at least one hour, and recovering a mercapto-alkoxy thio-ether from the reaction mixture as a product of the process.

13. A method for producing a compound containing the structure

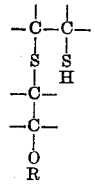

which comprises reacting together an olefin sulfide containing from 2 to 9 carbon atoms per molecule and a compound having the structure

and containing from 4 to 18 carbon atoms per molecule, where R is an organic radical, and recovering from resulting reaction products a compound containing the first said structure, so produced.

14. A chemical compound containing the structure

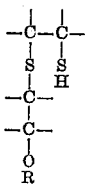

and which corresponds to the reaction product of one molecular equivalent of an olefin sulfide containing from 2 to 9 carbon atoms per molecule, with a molecular equivalent of a compound having the structure

and containing from 4 to 18 carbon atoms per molecule, where R is an organic radical.

15. The method of producing a mercapto-alkoxy thio-ether which comprises reacting an alkoxy thiol containing from 4 to 18 carbon atoms per molecule with an olefin sulfide containing from 2 to 9 carbon atoms per molecule, in the presence of a catalyst consisting a boron fluoride complex formed by the addition of boron fluoride and di-ethyl ether, and recovering from the reaction mixture a resulting mercapto-alkoxy thio-ether as a product of the process.

16. The method of producing a mercapto-alkoxy thio-ether which comprises reacting an alkoxy thiol containing from 4 to 18 carbon atoms per molecule with isobutylene sulfide, in the presence of boron fluoride etherate as a catalyst and recovering as a product of the process from the reaction mixture a resulting mercapto-alkoxy thio-ether.

HAROLD R. SNYDER.
JOHN M. STEWART.

REFERENCES CITED

The following references are of record in the file of this patent:

UNITED STATES PATENTS

| Number | Name | Date |
|---|---|---|
| 2,397,689 | Pavlic et al. | Apr. 2, 1946 |
| 2,402,878 | Doumani | June 25, 1946 |

FOREIGN PATENTS

| Number | Country | Date |
|---|---|---|
| 351,034 | Italy | Aug. 2, 1937 |
| 558,790 | Great Britain | Jan. 21, 1944 |
| 696,774 | Germany | Sept. 28, 1940 |

Certificate of Correction

February 14, 1950

Patent No. 2,497,100     HAROLD R. SNYDER ET AL.

It is hereby certified that errors appear in the printed specification of the above numbered patent requiring correction as follows:

Column 5, lines 69 and 70, for "2-(2' ethoxyethoxy ethyl thio ether" read *2-(2'ethoxyethoxy) ethyl thio-ether*; column 6, line 71, for "a" before "boron" read *of*; and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*